(12) United States Patent
Downs et al.

(10) Patent No.: US 7,398,162 B2
(45) Date of Patent: Jul. 8, 2008

(54) QUANTUM MECHANICAL MODEL-BASED SYSTEM AND METHOD FOR GLOBAL OPTIMIZATION

(75) Inventors: Oliver B. Downs, Woodinville, WA (US); Hagai Attias, Seattle, WA (US); Christopher J. C. Burges, Bellevue, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 332 days.

(21) Appl. No.: 10/372,160

(22) Filed: Feb. 21, 2003

(65) Prior Publication Data

US 2004/0167753 A1 Aug. 26, 2004

(51) Int. Cl.
*G06F 19/00* (2006.01)
(52) U.S. Cl. ................. 702/27; 703/2; 700/97
(58) Field of Classification Search ............ 700/28, 700/86, 97; 703/2; 702/27
See application file for complete search history.

(56) References Cited

U.S. PATENT DOCUMENTS

| | | | | |
|---|---|---|---|---|
| 5,612,894 | A * | 3/1997 | Wertz | 702/27 |
| 5,745,735 | A | 4/1998 | Cohn et al. | |
| 6,128,607 | A * | 10/2000 | Nordin et al. | 706/13 |
| 6,188,964 | B1 * | 2/2001 | Reister et al. | 702/17 |
| 6,269,277 | B1 * | 7/2001 | Hershenson et al. | 700/97 |
| 6,498,778 | B1 * | 12/2002 | Cwilich et al. | 370/216 |
| 6,578,018 | B1 * | 6/2003 | Ulyanov | 706/14 |
| 2003/0023470 | A1 * | 1/2003 | Labbi | |

OTHER PUBLICATIONS

P.W. Atkins and R.S. Friedman, "Molecular Quantum Mechanics: Third Edition," Oxford University Press, Oxford, 1997.*
Richard W. Robinett, "Quantum Mechanics: Classical Results, Modern Systems, and Visualized Examples," Oxford University Press, Oxford, 1997.*
Press et al, "Numerical Recipes in C: Second Edition," Cambridge University Press, New York, 1992.*
D.M. Hirst, "A Computational Approach to Chemistry," Blackwell Scientific, Oxford (1990).*
T. Clark, "A Handbook of Computational Chemistry: A Practical Guide to Chemical Structure and Energy Calculations," Wiley, New York (1985).*
Yamaguchi et al, "A New Dimension to Quantum Chemistry: Analytical Derivate Methods in Ab Initio Molecular Electronic Structure Theory," Oxford University Press, Oxford (1994).*

(Continued)

*Primary Examiner*—Jungwon Chang
(74) *Attorney, Agent, or Firm*—Amin, Turocy & Calvin, LLP

(57) ABSTRACT

A model-based system and method for global optimization that utilizes quantum mechanics in order to approximate the global minimum of a given problem (e.g., mathematical function). A quantum mechanical particle with a sufficiently large mass has a ground state solution to the Schrödinger Equation which is localized to the global minimum of the energy field, or potential, it experiences. A given function is modeled as a potential, and a quantum mechanical particle with a sufficiently large mass is placed in the potential. The ground state of the particle is determined, and the probability density function of the ground state of the particle is calculated. The peak of the probability density function is localized to the global minimum of the potential.

29 Claims, 8 Drawing Sheets

OTHER PUBLICATIONS

Szabo et al, "Modern Quantum Chemistry: Introduction to Advanced Electronic Structure Theory," Macmillan, New York (1982).*

Hasanein et al, "Computational Methods in Quantum Chemistry, vol. 2: Quantum Chemistry," M W Evans, Univ. North Carolina (1996).*

Atkinson et al, "Exercises in Quantum Mechanics: A Self-Contained Book of Questions and Answers," Rinton Press (2003).*

Lin, "Anisotropic Harmonic Oscillator in a Static Electromagnetic Field," Commun. Theor. Phys., vol. 38, p. 667-674 (2002).*

Rosenberg, "The Three-Dimensional, Quantum-Mechanical, Anisotropic-Harmonic Oscillator," American Journal of Physics, vo 37, No. 8, p. 839-40, Aug. 1969.*

Van Voorhis et al, "A Geometric Approach to Direct Minimization," Molecular Physics, vol. 100, No. 11, p. 1713-21, Jun. 10, 200.*

Breuer et al, "Numerical Integration Methods for Stochastic Wave Function Equations," Computer Physics Communications, vo 132, No. 1-2, p. 30-43, Oct. 15, 2000.*

Newsgroup: soc.retirement, subject: chaos-assisted tunneling, author: Sir Frederick, Sep. 28, 2001.*

"Finding Saddles on Multidimensional Potential Surfaces," Chem. Phys. Lett., vol. 147, p. 13, 1988.*

Simons et al, "Walking on Potential-Energy Surfaces," J. Phys. Chem., vol. 87, p. 2745-2753, 1983.*

E.R. Davidson (ed.), Chem. Rev., vol. 91, p. 649-1108 (1991).*

S. Gomez, A.V. Levy, "The tunneling method for solving the constrained global optimization problem with several non-connecte feasible regions," Lecture Notes in Mathematics, Springer-Verlag, vol. 909, pp. 34-47, 1982.*

Serra et al, "Comparison study of pivot methods for global optimization," J. Chem. Phys. 106, May 1, 1997.*

"Quantum Mechanics: Basic Concepts and Methods," Encyclopedia Britannica Online, Oct. 30, 2003.*

Kay Hamacher, "Stochastic Tunneling Approach for Global Optimization," http://www.physik.uni-dortmund.de/t1/qchem/comp_techn.html, Aug. 17, 1999.*

Mendivii et al, "Optimization by Stochastic Methods," Georgia Institute of Technology, Dec. 16, 1999.*

M. Bellare, S. Goldwasser, C. Lund and A. Russell, "Efficient Probabilistically Checkable *Proofs and Applications to Approximation*", 1993, 10 pages.

Christopher J.C. Burges, "Factoring as Optimization" Technical Report MSR-TR-2002-83, Microsoft Research, Microsoft Corporation, Aug. 2002, 18 pages.

J.J. Hopefield and D.W. Tank, ""Neutral" Computation of Decisions in Optimization Problems" Biological Cybernetics, 1985, 12 pages.

\* cited by examiner

QUANTUM MECHANICAL MODEL-BASED SYSTEM AND METHOD FOR GLOBAL OPTIMIZATION

TECHNICAL FIELD

This invention relates generally to global optimization of functions, and more specifically to computer implemented model-based global optimization of functions.

BACKGROUND OF THE INVENTION

"Optimization" is a process of finding an "ideal" and/or "best" solution to a given computer problem, as defined by a mathematical function describing a specific problem. Many problems exist which can be described by a mathematical function, wherein the "ideal" or "best" solution to the problem is the global minimum of the mathematical function.

The art of finding the global minimum of a function is referred to as global optimization. Model-based global optimization techniques have been applied to determine the minimum value for complex functions. A well-known example of a model-based global optimization technique is simulated annealing, which is a physical interpretation of a global optimization problem. Simulated annealing utilizes the classical laws of physics to determine a solution. Briefly, the simulated annealing process derives from the roughly analogous physical process of slowly cooling a particle within a system until the particle reaches its ground state. In simulation, a minimum of the function corresponds to this ground state of the particle.

More specifically, as the temperature of the system is lowered, the particle will slide in and out of certain minima. If the temperature is lowered slowly enough, the particle will eventually slide into the global minimum and thus reach its ground state.

Simulated annealing, as well as other known global optimization techniques, decreases in efficiency as the dimensionality (and thus complexity) of a problem grows. For example, when using the simulated annealing method to factor an integer, the computational time to factor the integer can grow (e.g., exponentially) with the size of the integer.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method for analytically approximating the location of the global minimum of a function. The size of the function is not limited in terms of the function's dimensionality.

In accordance with an aspect of the present invention, a global optimization system employs a quantum mechanical tunneling technique in connection with determining an optimal solution of the problem from among a plurality of solutions. The determination can be based, at least in part, upon utilities associated with the respective solutions. The system includes an input component, an optimization component and an output component.

The input component receives a problem. The problem is based, at least in part, upon a mathematical function. The input component provides the problem to the optimization component.

The optimization component employs a quantum mechanical tunneling technique in connection with determining an optimal solution of the problem from among a plurality of solutions. The determination is based, at least in part, upon utilities associated with the respective solutions.

First, in order to determine the global minimum of a function, the optimization component models the mathematical function as a potential, and the potential contains a particle. The optimization component then computes an approximation of the ground state solution of a quantum system, localized to the global minimum of the potential. In one example, a gradient method is used to determine (e.g., exactly) the location of the global minimum of the potential after the approximation has been calculated.

The global minimum is calculated by determining the ground state of the particle within the potential. The wave function corresponding the ground state of the particle can then be used to calculate the probability density function of the ground state of the particle. The probability density function has a single peak which corresponds to the global minimum of the potential.

The ground state of the particle is generally determined by creating an approximation to the potential, and then using a combination of the basis functions corresponding to solutions of the Schrödinger Equation for that approximation to approximate solutions of the Schrödinger Equation for the full potential. In accordance with an aspect of the present invention, in the case of a one-dimensional function, the approximation of the potential is created through the use of a harmonic oscillator and its corresponding basis function solutions to the Schrödinger Equation. The full potential of the system is then expressed as the harmonic oscillator approximation at the local minimum plus a perturbation corresponding to the difference between the harmonic oscillator approximation and the full potential. An approximation to the ground state of the full potential can be created by a weighted summation of the basis functions corresponding to solutions of a quantum system comprising solely of the harmonic oscillator potential. The number of basis functions to be used to approximate the ground state of the full potential and hence locate the global minimum of the potential can be limited to those basis functions with a predetermined energy level.

In the case of an N-dimensional function, the approximation of the potential is obtained by creating a Hessian matrix at a local minimum of the potential. By changing the coordinates of the function to the eigenbasis of the Hessian matrix at the local minimum of the potential, the harmonic oscillator wave functions at the local minimum are factorized. The matrix elements of the harmonic oscillators used to approximate the local minimum are then computed under the full Hamiltonian of the system. The matrix elements of the local harmonic oscillator wave functions are then evaluated in terms of one dimensional "ladder" operators. Eigen-decomposition of the matrix computed under the full Hamiltonian of the system creates the eigenstate wave functions. Finally, the approximate ground state solution to the full potential can be calculated by determining the weighted sum of the basis functions of the harmonic oscillator approximation that minimizes the energy expectation of the approximate ground state.

Once the optimization component has determined the optimal solution to the problem (e.g., mathematical function), the output component provides the optimal solution, for example, to a computer monitor, printer and/or other output device(s).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
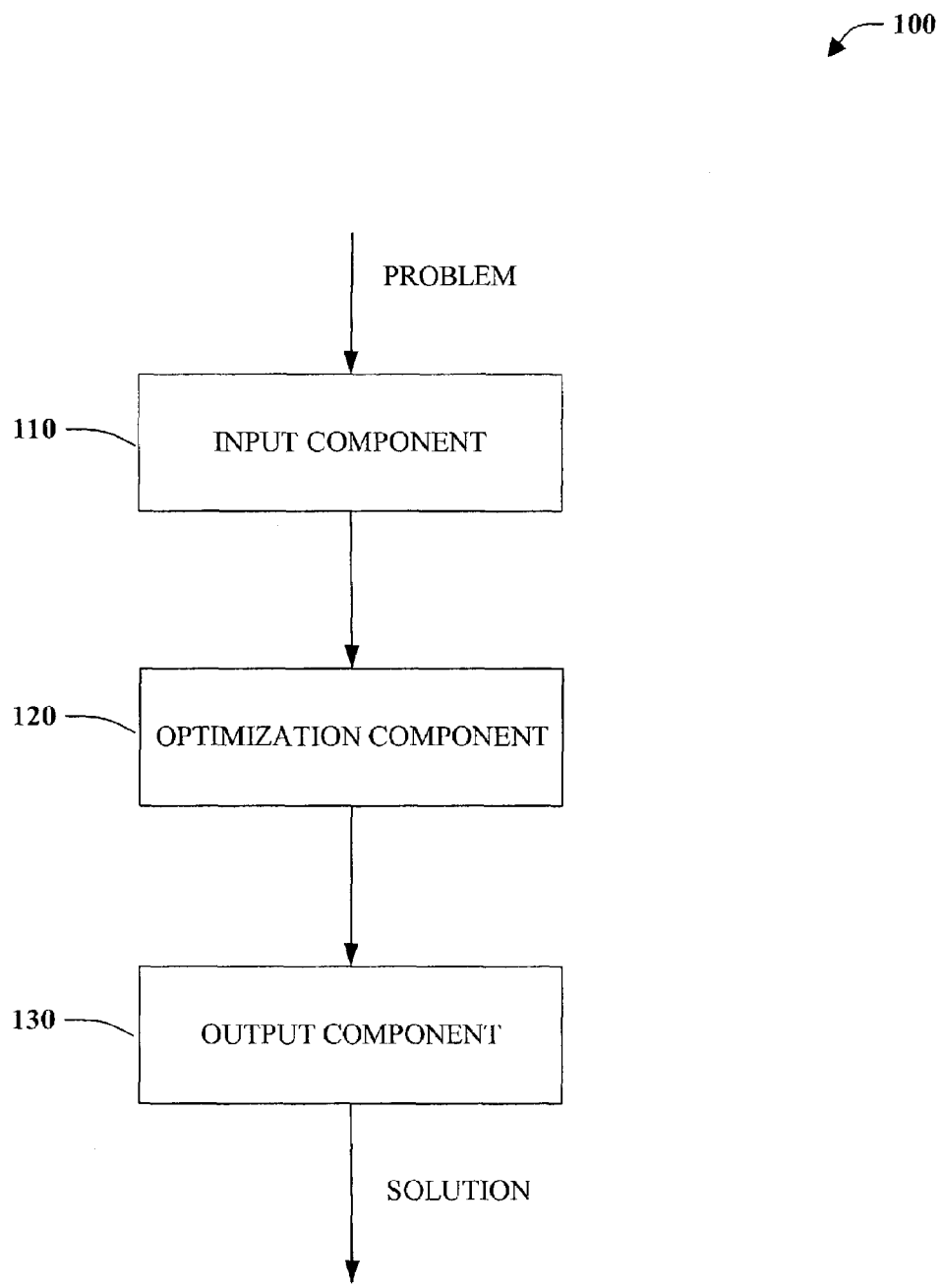
FIG. 1 is a block diagram of a global optimization system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a global optimization system 100 in accordance with an aspect of the present invention is illustrated. The system 100 comprises an input component 110, an optimization component 120 and an output component 130.

The system 100 employs a quantum mechanics tunneling technique in connection with determining an optimal solution of a problem from among a plurality of solutions. The determination can be based, at least in part, upon utilities associated with the respective solutions.

The input component 110 receives a problem. The problem is based, at least in part, upon a mathematical function. The input component 110 provides the problem to the optimization component 120.

The optimization component 120 employs a quantum mechanics tunneling technique in connection with determining an optimal solution of the problem from among a plurality of solutions. The determination is based, at least in part, upon utilities associated with the respective solutions.

Figure 2:
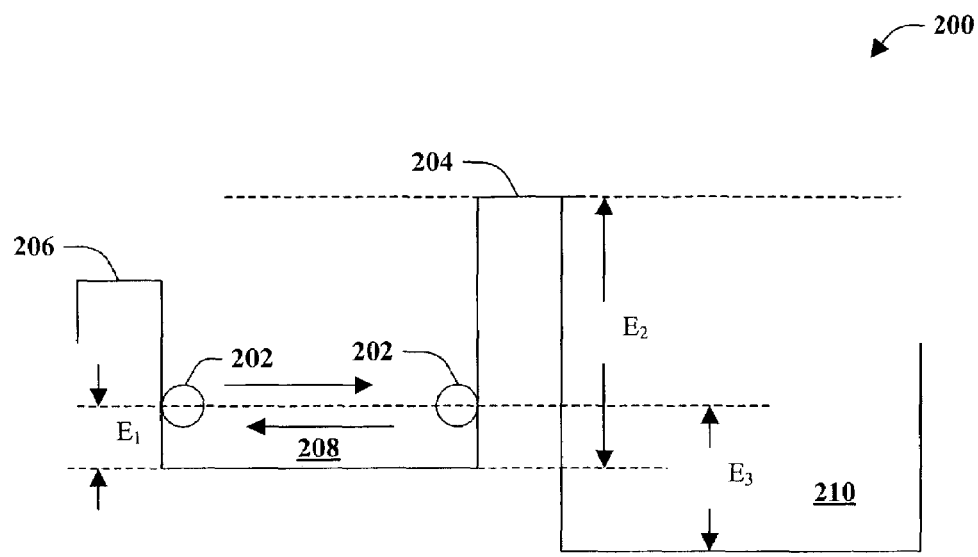
FIG. 2 is a diagram of a particle in a classical physics system.

Turning briefly to FIG. 2, a particle 202 in a classical physics system 200 is illustrated. The system 200 includes a particle 202, energy barriers 204 and 206, and energy wells 208, 210. The particle 202 contains energy $E_1$ with respect to the bottom of well 208. Barrier 204 contains energy $E_2$ with respect to the bottom of well 208. If particle 202 were to transition to the other side of barrier 204, the particle would contain energy $E_3$ with respect to the bottom of well 210.

Classical physics provides that particle 202 cannot transition to well 210 at its current energy level $E_1$. In a classical physics system, particle 202 can transition to well 210 only if the energy of particle 202 becomes greater than $E_2$, the energy of barrier 204. In order for this to occur, the system 200 must be altered in order for particle 202 to obtain an energy greater than $E_2$, or the system 200 must be held constant in hopes that particle 202 will accidentally obtain an energy greater than $E_2$. Otherwise particle 202 will reflect off of barrier 204 towards barrier 206. Thus even though the particle 202 could reach a lower level of energy in well 210, in a classical physics system particle 202 will remain in well 208.

Figure 3:
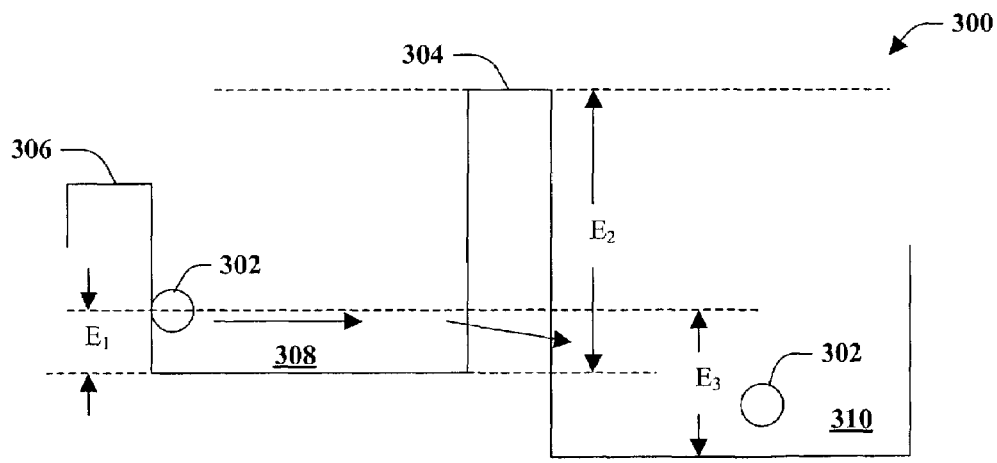
FIG. 3 is a diagram of a particle in a quantum mechanics system.

Referring next to FIG. 3, a quantum mechanics system 300 is illustrated. The system 300 includes a particle 302, energy barriers 304 and 306, and energy wells 308, 310. The particle 302 contains energy $E_1$ with respect to the bottom of well 308. Barrier 304 contains energy $E_2$ with respect to the bottom of well 308. If particle 302 were to transition to the other side of barrier 304, the particle would contain energy $E_3$ with respect to the bottom of well 310.

As illustrated in FIG. 3, particle 302 is in well 308 moving towards barrier 304. Even though the energy $E_1$ of particle 302 with respect to the bottom of well 308 is less than the energy $E_2$ of barrier 304 with respect to the bottom of well 308, there is a finite probability that particle 302 will tunnel through barrier 304 to reach well 310. Thus particle 302 can reach well 310 not by going over barrier 304, but by tunneling through the barrier 304.

Confined quantum mechanical particles are only able to have discrete energy levels, the lowest of which is termed the ground state. If the mass of the particle is sufficiently large, the ground state of the particle will correspond to the global minimum of the energy of the system in which it resides.

In quantum mechanics, a potential function $\hat{V}(x)$ describes the energy terrain experienced by a particle. The terrain may contain multiple minima separated by barriers. Combined with a term describing the kinetic energy of the particle, it defines the Hamiltonian operator:

$$\hat{H} = -\frac{\hbar^2}{2m}\nabla^2 + \hat{V} \qquad (1)$$

Quantum mechanics captures all available information on the state of the particle in a complex wave function ψ(x). For instance, |ψ(x)|² is the probability distribution over the position x of the particle.

Thus, the behavior of an atomic particle, such as the particle 302 in FIG. 3, can be fully described in space by a wave function ψ(x,t). The Schrödinger Equation is the differential equation that describes the evolution of the wave function. The Schrödinger Equation can be written as:

$$i\hbar \frac{\partial \psi(x,t)}{\partial t} = -\frac{\hbar^2}{2m} \nabla^2 \psi(x,t) + \hat{V}(x,t)\psi(x,t), \quad (2)$$

where $\hat{V}(x,t)$ is the energy terrain (potential) experienced by a particle (where x denotes position and t denotes time), which may contain multiple minima separated by barriers; ψ(x,t) is the wave function describing the particle defined at x and t; i is the imaginary number $\sqrt{-1}$; $\hbar$ is Planck's constant; m is the mass of the particle, and $\nabla^2$ is the Laplacian operator $$\frac{\partial^2}{\partial x^2} + \frac{\partial^2}{\partial y^2} + \frac{\partial^2}{\partial z^2}.$$

The term $$-\frac{\hbar^2}{2m}\nabla^2 + \hat{V}(x,t)$$

defines the Hamiltonian operator $\hat{H}(x,t)$, allowing the Schrödinger Equation to be rewritten as:

$$i\hbar \frac{d\psi(x,t)}{dt} = \hat{H}(x,t)\psi(x,t). \quad (3)$$

This equation is used to find ψ(x,t). The probability density function, p(x,t) can then be found by squaring the modulus of the (complex) wave function, such that p(x,t)=|ψ(x,t)|².

As described above, if the mass of the atomic particle is sufficiently large then the probability density corresponding to the lowest energy state of the particle will be localized at the global minimum of the system. However, because the potentials considered do not depend on time, in accordance with an aspect of the present invention the optimization component 120 utilizes a time independent version of the Schrödinger Equation:

$$\hat{H}(x)\psi(x) = E\psi(x), \quad (4)$$

where E is the energy of the system. The solution to the time-independent equation is a set of wave functions termed eigenstates, and a matching set of energies. The eigenstate with the lowest energy is the ground state, $\psi^0$.

If the mass of the particle is chosen to be sufficiently large, the probability density function of the ground state $\psi^0$ will be localized to the global minimum of the potential, V(x). The Schrödinger Equation, however, can only be solved analytically for the energy states of a limited set of systems.

Thus, in one example, the optimization component 120 encodes the optimization problem into a polynomial cost function. The global minimum of the cost function is then found. The problem(s) that the optimization component 120 is intended to encode generally do not fall within the limited set of systems for which exact solutions to Schrödinger's Equation can be found, and, thus, in one example, an approximation is employed by the optimization component 120. In order to create an approximation of the energy states of a particle, the optimization component 120 expands the set of solutions of a given intractable system in terms of a set of solutions that can be solved by the Schrödinger Equation. In one example, the optimization component 120 expands the set of solutions through the use of an anisotropic harmonic oscillator.

Harmonic oscillators are well known in the field of quantum mechanics. The set of solutions to the Schrödinger Equation for a one-dimensional harmonic oscillator is given by:

$$\phi_{simple}^n(x) = c_n h_n(y) e^{-\frac{y^2}{2}}, \quad (5)$$

where $h_n(y)$ is the nth Hermite Polynomial, y is the rescaling of x, $c_n$ is the normalization constant, and $h_0(y)=1$; $h_1(y)=2y$; $h_{n+1}(y)=2yh_n(y)-2nh_{n-1}(y)$.

These solutions to a harmonic oscillator at the local minimum will hereafter be referred to as the basis functions of the approximation. The creation of a harmonic oscillator approximation to a quantum mechanical system is well known in the field of quantum mechanics.

To approximately solve for the ground state of the full system, it is first assumed that a local minimum of the potential function has been found. Then a simple harmonic oscillator (quadratic) approximation to the potential at the local minimum is made.

Figure 4:
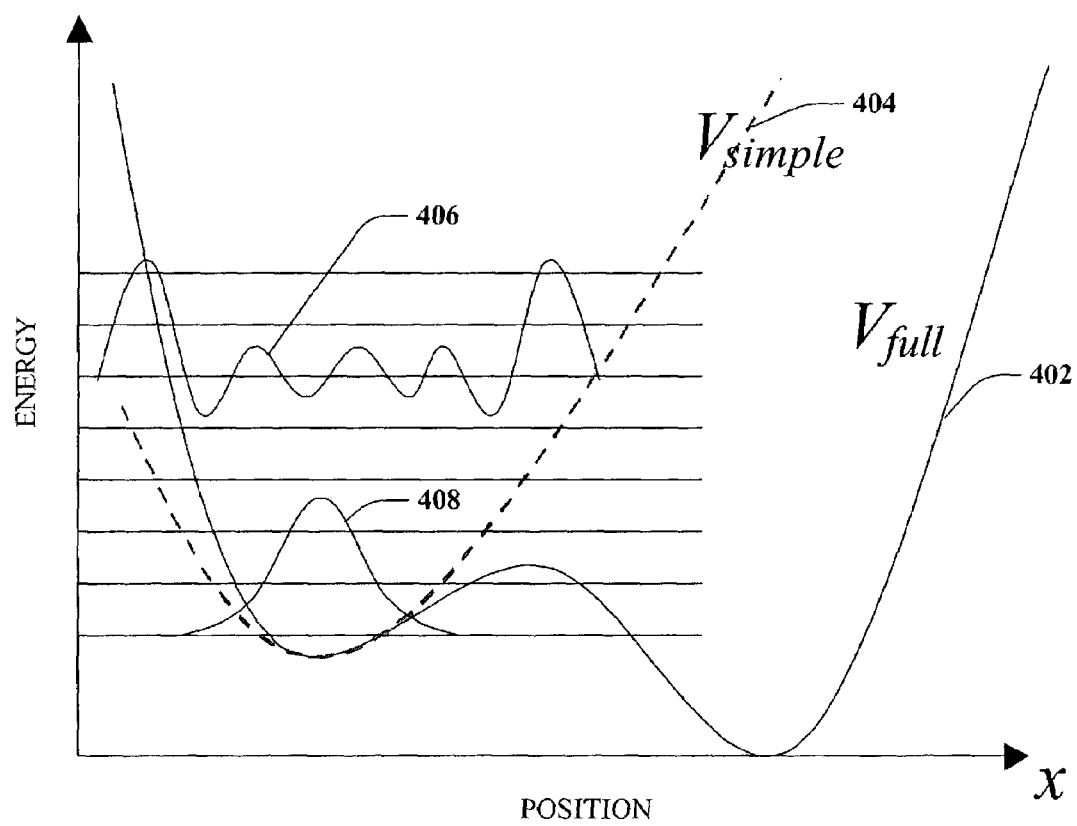
FIG. 4 is a graph illustrating an exemplary approximate solution in accordance with an aspect of the present invention.

In one example the optimization component 120 employs the basis functions corresponding to this approximation to produce an approximation of the location of the global minimum of the potential. Referring to FIG. 4, a graph 400 illustrating an exemplary approximate solution in accordance with an aspect of the present invention is illustrated. In this example, the full potential $V_{full}$ 402 equals $V_{simple}$ 404+$V_{perturb}$, where $V_{simple}$ 404 is the harmonic oscillator approximation and $V_{perturb}$ is the perturbation to the harmonic oscillator approximation.

In order to compute the lowest energy state of the system, a harmonic oscillator approximation $\phi_{full}$ for the entire potential $V_{full}$ 402 needs to be created. This is done by expanding the eigenfunctions in terms of basis function solutions to the Schrödinger Equation for $V_{simple}$ 404. The expansion appears as follows:

$$\phi_{full}(x) = \Sigma_k \alpha_k \phi_{simple}^k(x), \quad (6)$$

where $\alpha_k$ represents the coefficient of the kth harmonic oscillator basis function in the approximation of the ground state, $\phi_{full}(x)$. Following the previous calculation, the lowest energy eigenstate can be approximated by minimizing the energy expectation of $\phi_{full}(x)$:

$$E = \left\langle \phi_{full} \left| -\frac{\hbar^2}{2m}\nabla^2 + V_{simple} + V_{perturb} \right| \phi_{full} \right\rangle. \quad (7)$$

Substituting for $\phi_{full}(x)$ with its expansion in terms of the set of basis functions $\{\phi_{simple}^k(x)\}$, this is equivalent to minimizing E with respect to the coefficients $\alpha_k$ of the expansion:

$$E = \sum_{k,l} \alpha_k \alpha_l \langle \phi_{simple}^k | -\frac{\hbar^2}{2m}\nabla^2 + V_{simple} + V_{perturb} | \phi_{simple}^l \rangle. \quad (8)$$

subject to the constraint $$\sum_k |\alpha_k|^2 = 1.$$

The set of coefficients, $\alpha_k$, solving this problem correspond to the eigenvector with lowest eigenvalue of the matrix with elements:

$$M_{kl} = \langle \phi_{simple}^k | -\frac{\hbar^2}{2m}\nabla^2 + V_{simple} + V_{perturb} | \phi_{simple}^l \rangle \quad (9)$$

Thus equating $V_{simple}$ 404 with a local quadratic approximation through the use of a harmonic oscillator, and, finding an approximation for the lowest energy eigenstate is a mathematically tractable problem for any polynomial $V_{full}$ 402.

After computing the lowest energy eigenstate, an approximation is obtained of the wave function that describes (e.g., completely) the particle's activities at its lowest energy state, $\psi^{(0)}(x)$. The approximation of $\psi^{(0)}(x)$ is then used to solve for the probability density function of the location of the particle, $p^{(0)}(x)$ by squaring $\psi^{(0)}(x)$. The result is a localized single peak approximation for the location of the global minimum of the polynomial. A gradient method, initialized from the mean of the probability distribution, can then be used to determine (e.g., exactly) the location of the global minimum. FIG. 4 includes the single peak of the probability density function 408 localized to the global minimum of the polynomial 406.

In another example, the dimensionality of the problem (e.g., mathematical function) that is attempting to be solved by the optimization component 120 is unrestricted. Thus the equations governing quantum mechanics that are applicable to a one-dimensional problem are also applicable to an N-dimensional (e.g., multi-dimensional) problem. Thus, the optimization component 120 can be used to find an optimal solution for N-dimensional problem(s) based, at least in part, upon an approximation of a global minimum of a one-dimensional problem.

In one example, the optimization component 120 obtains a global minimum approximation in an N-dimensional problem similar to achieving a global minimum approximation in a one-dimensional problem as discussed above. Again it is understood that a local minimum has been located. Then an anisotropic harmonic oscillator approximation of the function at the local minimum is made by computing its Hessian. A Hessian is an n×n matrix that is used to manipulate func tions with multiple variables $x_1, x_2, \ldots x_n$, wherein the (i,j) element of the matrix is $$\frac{\partial^2 f}{\partial x_i \partial x_j}.$$

The coordinates of the N-dimensional potential function are rotated to the eigenbasis of the Hessian at the local minimum, thus factorizing the harmonic oscillator wave functions. The factorized wave functions are then used as a set of basis functions for the approximation of the ground state of the particle.

The matrix elements of the local harmonic oscillator wave functions $\{\phi^n\}$ are computed under the full Hamiltonian of the system using the following matrix definition: $M_{mn} = \langle \phi^m | \hat{H} | \phi^n \rangle$. The matrix elements are then evaluated by representing the full Hamiltonian in terms of the N 1-dimensional "ladder" operators of the harmonic oscillator approximation. The "ladder" operators are well-known in the field of quantum mechanics, and are represented by the following equations:

$$\hat{A}_i = \sqrt{\frac{m\omega_i}{2}} x_i + \frac{\hbar}{\sqrt{2m\omega_i}} \frac{\partial}{\partial x_i} \text{ and} \quad (10)$$

$$\hat{A}_i^+ = \sqrt{\frac{m\omega_i}{2}} x_i - \frac{\hbar}{\sqrt{2m\omega_i}} \frac{\partial}{\partial x_i}.$$

By using these "ladder" operators, in an N-dimensional space the present invention allows an N-dimensional harmonic oscillator approximation to be found at the local minimum by computing a series of N one-dimensional tractable computations.

The matrix elements can be computed in an N-dimensional space at a computational cost of order $N^4$, of which to the order of $N^3$ is the computational cost for determining the diagonal basis of the Hessian matrix at the local minimum, and the additional linear term in the dimensionality is for computing the integrals as a series of N one-dimensional computations.

Eigen-decomposition of the matrix M yields an approximation for the energy levels in the full potential $V_{full}$, as well as the approximate eigenstate wave functions, the eigenvectors $\{\vec{e}_k\}$. After the energy levels and eigenvectors are determined, finding the global minimum of the N-dimensional potential is the same as finding the global minimum for a one-dimensional potential. The approximation for the ground state wavefunction $\psi^0$ is found by summing the basis functions weighted by the elements of the eigenvector of M corresponding to the lowest eigenvalue, $\vec{e}_0$.

$$\psi^0(\vec{x})_{full} \approx \sum_{l=1}^{K} (\vec{e}_0)_l \phi^l(\vec{x}). \quad (11)$$

Using this wave function, the probability density function of the particle can be located as described in the one-dimensional case.

The optimization component 120 can further determine the number of basis functions to use to create a sufficient approximation of the full potential. If prior to attempting to solve the problem the number of basis functions needed to create a sufficient approximation of the ground state of the full potential can be determined not to grow exponentially with the dimensionality of the system N, then the computation time will not grow exponentially with the complexity of the problem, and thus approximate solution to the problem will not be "hard."

In one example, the energy field of the types of problem(s) the present invention can be used for, such as factoring and a traveling salesman problem, is restricted to a binary hypercube. Also, as the discrete energy level used to calculate a basis function increases, the spatial span of that basis function increases. At some point, the spatial span of the basis function will extend beyond the space of the energy field of interest. This observation indicates that the number of basis functions required to create an approximation of the full potential is finite.

Figure 5:
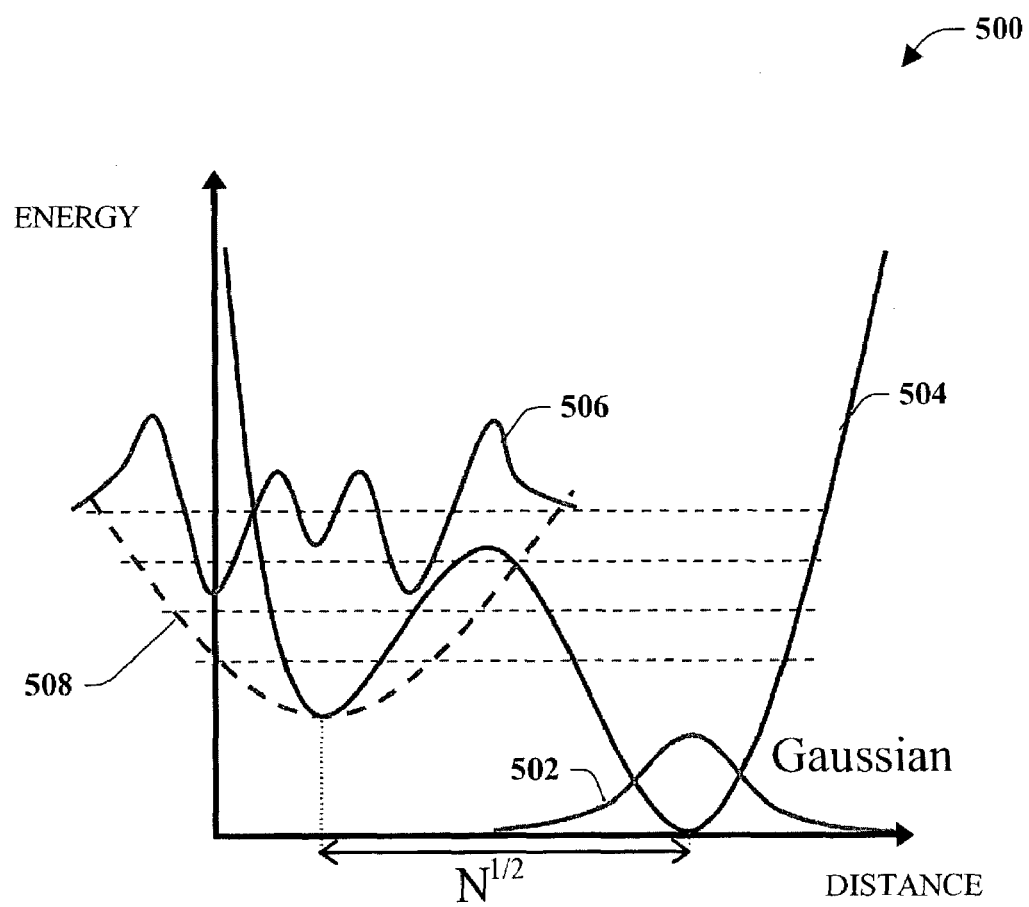
FIG. 5 is a diagram displaying the approximation of a potential and a way to limit basis functions in accordance with an aspect of the present invention.

Referring to FIG. 5, a graph 500 illustrating an indication of the quantity of basis functions required from the ladder of harmonic oscillator basis functions can be obtained by considering the overlap of the nth basis function with a Gaussian curve 502 of similar width located the global minimum of the potential 504. The graph 500 includes a harmonic oscillator 506 approximation to a local minimum 508. The most distant local minimum from the global minimum will be at the diagonally opposite corner of the binary hypercube, assuming this case yields a discrete Poisson distribution over the overlap of the nth function $$p(n) = e^{-\alpha^2} \frac{\alpha^{2n}}{n!}$$

with mean and variance $$\alpha^2 = \frac{N}{2} \frac{m\omega}{\hbar},$$

where ω is the square-root of the curvature of the local minimum along the diagonal of the hypercube. If the approximations are assembled using K(N) basis functions, it can be shown that the computational cost is of order $N^4 K(N)^2$, where N is the dimensionality of the problem. This Poisson distribution suggests that the number of basis functions grows exponentially with N, (e.g., $K \propto \kappa^N$ where κ is a constant). However, the actual number of useful basis functions does not grow exponentially with N.

Through experimentation it has been found that a small number of basis functions are required to adequately approximate the full potential. Thus in order to reduce the computational cost so that K grows polynomially with N, basis functions having a low energy under the full Hamiltonian can be selected. This can be done by thresholding the energy level according to the dimensionality of the problem.

The output component 130 provides the optimal solution to the problem determined by the optimization component 120. For example, the output component 130 can provide the optimal solution to a computer monitor, printer and/or other output device(s).

The system 100 can be utilized to find the global minimum of a problem that can be encoded as a polynomial cost function (such as the traveling salesman problem), as well as factoring problems. Once the problem is encoded, theories of quantum mechanics are used to model the polynomial as a system. A quantum particle with a sufficient mass is placed within the system. The problem is solved for the ground state of the particle, $\psi^{(0)}$. The probability density function of the ground state, wherein $p^{(0)}(x) = |\psi^{(0)}(x)|^2$, is taken, and results in a single peak localized to the global minimum of the potential.

While FIG. 1 is a block diagram illustrating components for the global optimization system 100, it is to be appreciated that the global optimization system 100, the input component 110, the optimization component 120 and/or the output component 130 can be implemented as one or more computer components, as that term is defined herein. Thus, it is to be appreciated that computer executable components operable to implement the global optimization system 100, the input component 110, the optimization component 120 and/or the output component 130 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 6:
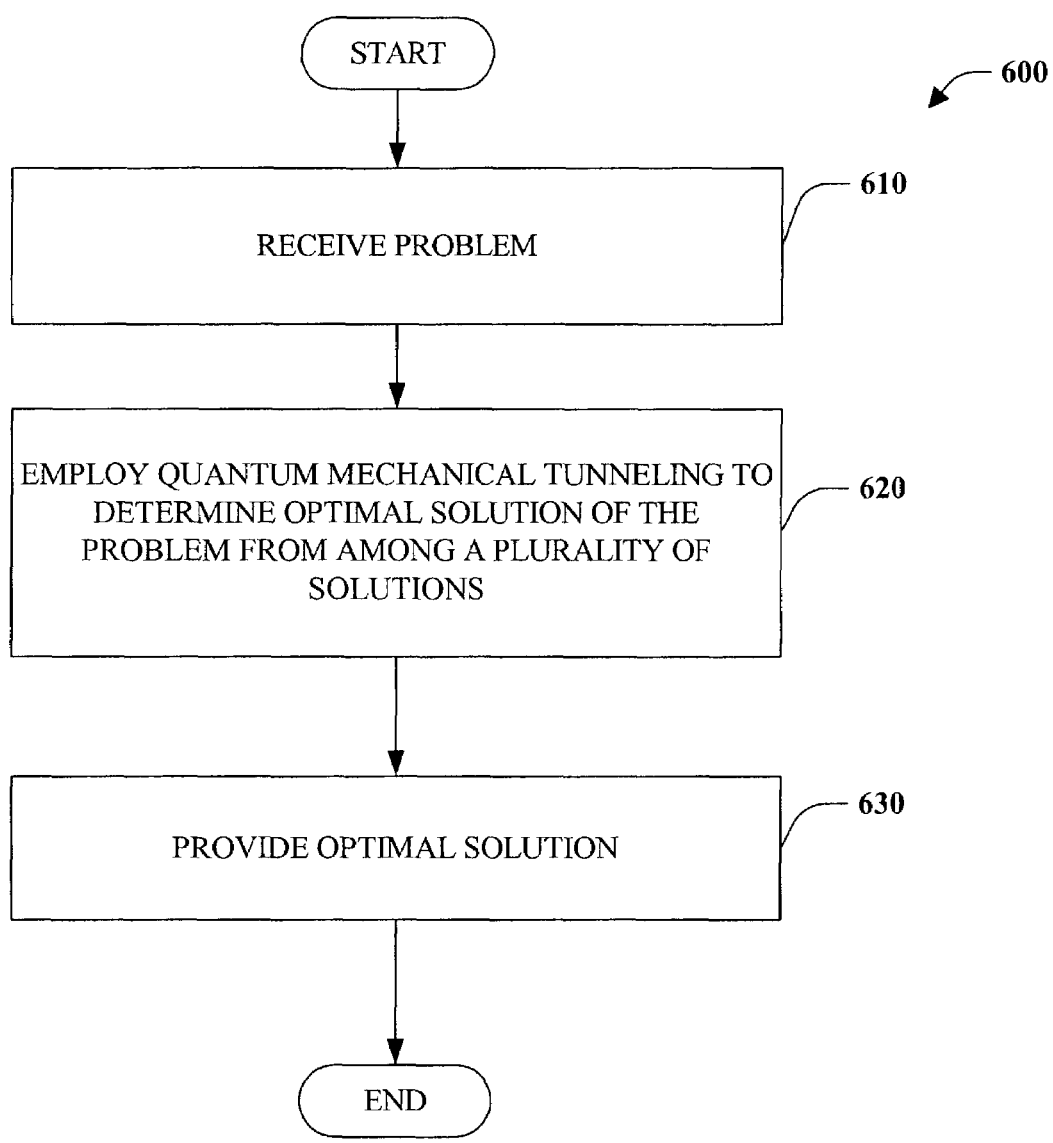
FIG. 6 is a flow chart illustrating a global optimization method in accordance with an aspect of the present invention.
Figure 7:
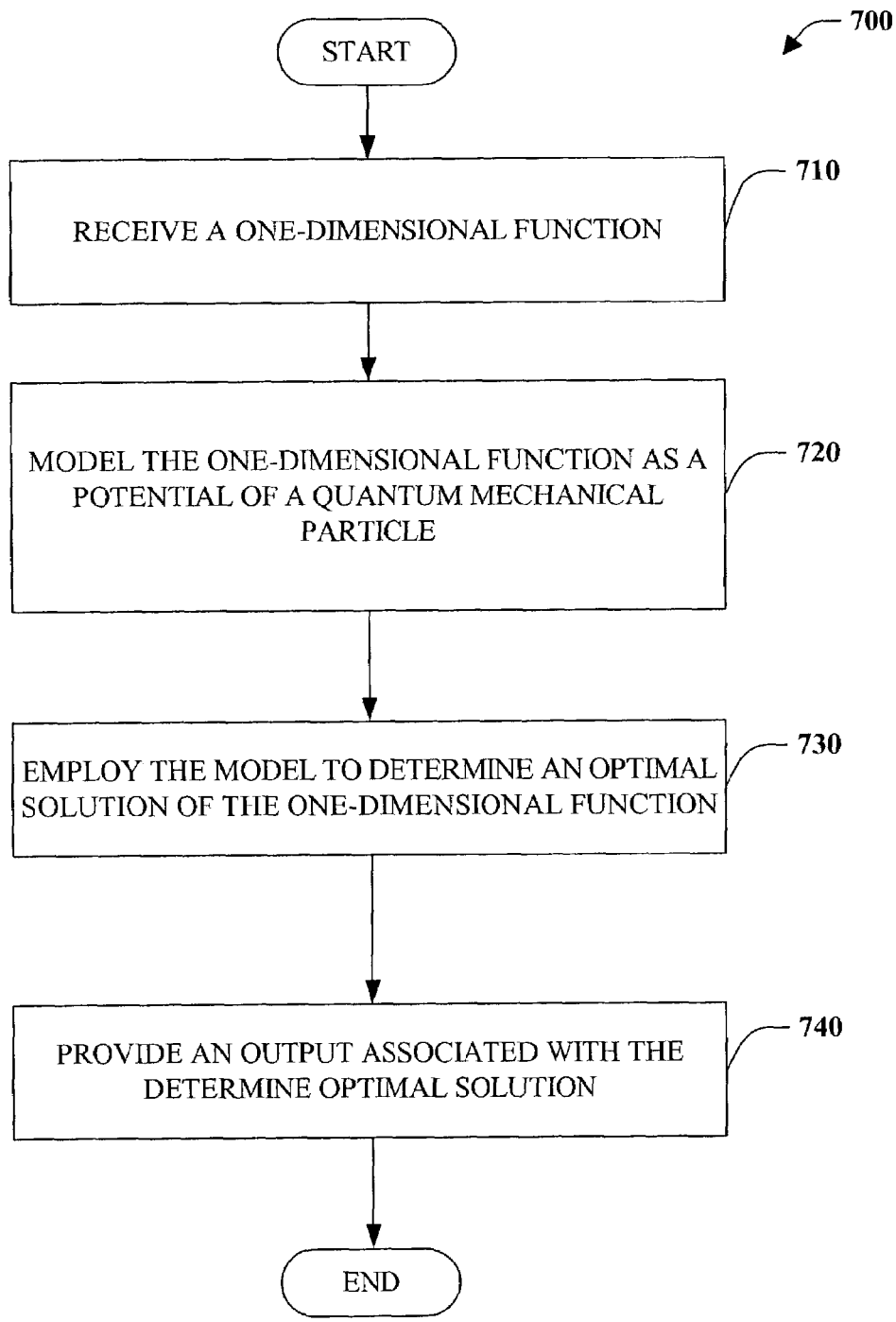
FIG. 7 is a flow chart illustrating a global optimization method in accordance with an aspect of the present invention.
Figure 8:
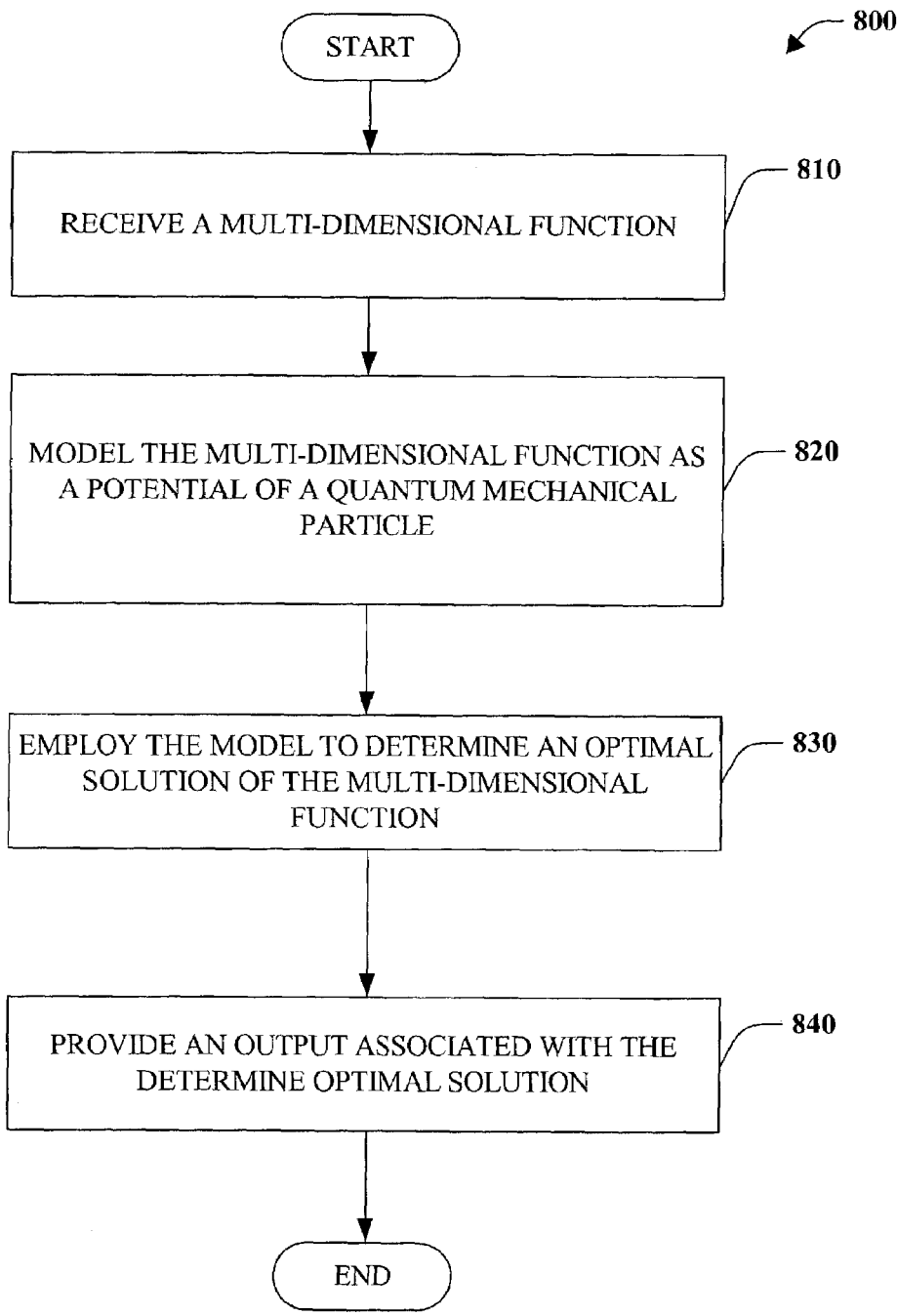
FIG. 8 is a flow chart illustrating a global optimization method in accordance with an aspect of the present invention.

Turning briefly to FIGS. 6, 7 and 8 methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a global optimization method 600 in accordance with an aspect of the present invention is illustrated. At 610, a problem (e.g., mathematical function) is received. At 620, a quantum mechanical tunneling technique is employed in connection with determining an optimal solution of the problem from among a plurality of solutions (e.g., by an optimization component 120). At 630, an output associated with the determined optimal solution is provided.

Next, turning to FIG. 7, a global optimization method 700 in accordance with an aspect of the present invention is illustrated. At 710, a one-dimensional function is received. At 720, the one-dimensional function is modeled as a potential of a quantum mechanics particle. In one example, the model includes utilizing a gradient method to determine a location of a global minimum of the potential. In another example, the model includes determining a ground state of the particle and/or calculating the probability density function of the ground state of the particle. For example, the ground state of the particle can be determined by creating an approximation of the potential and/or employing the approximation of the potential to calculate a probability density function of the ground state of the particle based, at least in part, upon the time-independent Schrödinger Equation.

In one example, the approximation of the potential can be based, at least in part, upon a harmonic oscillator (quadratic)

approximation to the potential at a local minimum, to which the corresponding eigenstates can be used as basis functions for an approximate expansion of the ground state of the system corresponding to the full potential. The basis functions can be limited to those having an energy below a predetermined level.

At 730, the model is employed to determine an optimal solution of the one-dimensional function. At 740, an output associated with the determined optimal solution is provided.

Referring to FIG. 8, a global optimization method 800 in accordance with an aspect of the present invention is illustrated. At 810, a multi-dimensional function is received. At 820, the multi-dimensional function is modeled as a potential of a quantum mechanical particle.

In one example, the model includes utilizing a gradient method to determine a location of a global minimum of the potential. Further, the model can include determining a ground state of the particle and/or calculating a probability density function of the ground state of the particle. A ground state of the particle can be determined by creating an approximation of the potential and employing the approximation of the potential to calculate a probability density function of the ground state of the particle based, at least in part, upon the time-independent Schrödinger Equation.

Creating an approximation of the potential can be based, for example, at least in part, upon a harmonic oscillator. Additionally and/or alternatively, creating an approximation of the potential further can include creating a Hessian matrix of a local minimum of the potential, factorizing harmonic oscillator wave functions by changing the coordinates of the system to an eigenbasis of the Hessian matrix at the local minimum of the potential (e.g., multi-dimensional harmonic oscillator approximation), computing matrix elements of the local harmonic oscillator wave functions under a full Hamiltonian of the system, $M_{kl}$, evaluating those matrix elements of the local harmonic oscillator wave functions in terms of one dimensional ladder operators, eigen-decomposing the matrix in order to create eigenstate wave functions, and/or summing the basis functions corresponding to the local harmonic oscillator approximation with coefficients $\alpha_k$ given by the lowest eigenvalue eigenvector of M. The basis functions used to approximate the local minimum of the function can be limited to those with energy below a pre-determined energy level.

At 830, the model is employed to determine an optimal solution of the multi-dimensional function. At 840, an output associated with the determined optimal solution is provided.

Figure 9:
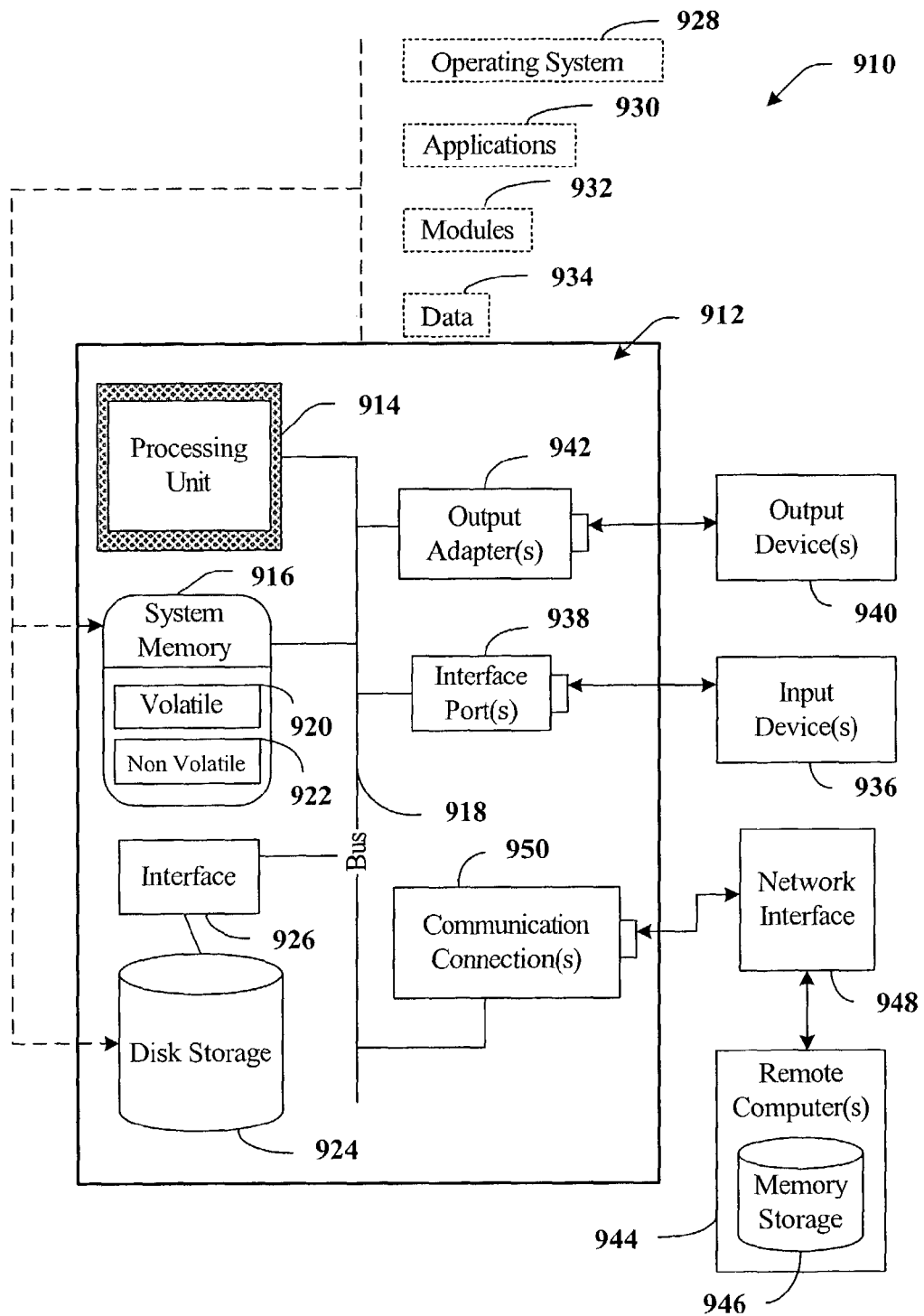
FIG. 9 illustrates an example operating environment in which the present invention may function.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented calculational system for finding a global optimization for a mathematical problem describing a specific problem comprising:
   an input component that receives the mathematical problem describing a specific problem, the problem being based, at least in part, upon a mathematical function;
   an optimization component that employs a quantum mechanical tunneling technique in connection with determining an optimal solution of the problem from among a plurality of solutions, the determination being based, at least in part, upon utilities associated with the respective solutions, the optimal solution corresponds to an approximation of a ground state solution of a quantum system, localized to the global minimum of a modeled energy potential of a particle in the quantum system;
   an output component that provides the optimal solution determined by the optimization component; and,
   an output device that outputs the optimal solution.

2. The system of claim 1, the optimization component utilizing the equation:

$$i\hbar \frac{\partial \psi(x,t)}{\partial t} = -\frac{\hbar^2}{2m}\nabla^2 \psi(x,t) + \hat{V}(x,t)\psi(x,t),$$

where $\hat{V}(x,t)$ is the energy potential experienced by the particle defined by space and time, $\psi(x,t)$ is a wave function describing an energy of the particle defined by space and time;
i is the imaginary number $\sqrt{-1}$;
$\hbar$ is Planek's constant;
m is a mass of the particle; and,
$\nabla^2$ is the Laplacian operator $$\frac{\partial^2}{\partial x^2} + \frac{\partial^2}{\partial y^2} + \frac{\partial^2}{\partial z^2}.$$

3. The system of claim 2, wherein the energy potential experienced by the particle includes multiple minima separated by barriers.

4. The system of claim 1, wherein the optimization component 120 utilizes the equation:

$\hat{H}(x)\psi(x)=E\psi(x),$ where E is an energy of the particle.

5. The system of claim 1, the optimization component employs an approximation of energy potentials of the particle, the optimization component employing the approximation to calculate a probability density function of the ground state of the particle based, at least in part, upon the time-independent Schrödinger Equation.

6. The system of claim 5, the optimization component determining the plurality of solutions through the use of an anisotropic harmonic oscillator.

7. The system of claim 1, wherein the mathematical function is one-dimensional.

8. The system of claim 1, wherein the mathematical function is N-dimensional, where N is an integer greater than one.

9. The system of claim 8, the optimization component employing an approximation of a ground state of a one-dimensional problem to find the optimal solution.

10. The system of claim 9, the optimization component employing an anisotropic harmonic oscillator approximation of the mathematical function at a local minimum based, at least in part, upon a computed Hessian.

11. A computer-implemented calculational method for finding a global optimization of a mathematical problem describing a specific problem comprising:

receiving the mathematical problem describing a specific problem;

employing a quantum mechanical tunneling technique in connection with determining an optimal solution of the problem from among a plurality of solutions, the optimal solution corresponding to an approximation of a ground state solution of a particle in a modeled quantum system; and, providing an output associated with the determined optimal solution to an output device.

12. A computer-implemented global optimization method comprising:

receiving a one-dimensional function describing a specific problem;

modeling the one-dimensional function as a potential of a quantum mechanical particle;

employing the model to determine an optimal solution of the one-dimensional function, the optimal solution corresponds to an approximation of a ground state solution of the potential of the quantum mechanical particle; and, providing an output associated with the determined optimal solution to an output device.

13. The method of claim 12, further comprising utilizing a gradient method to determine a location of a global minimum of the potential.

14. The method of claim 12, further comprising at least one of the following acts:

determining a ground state of the particle; or, calculating the probability density function of the ground state of the particle.

15. The method of claim 14, determining a ground state of the particle is determined by at least one of the following acts:

creating an approximation of the potential;

employing the approximation of the potential to calculate a probability density function of the ground state of the particle based, at least in part, upon the time-independent Schrödinger Equation.

16. The method of claim 15, wherein creating an approximation of the potential is based, at least in part, upon a harmonic oscillator.

17. The method of claim 15, creating an approximation of the potential further comprising at least one of the following acts:

creating an approximation of the potential at a local minimum;

determining a perturbation of the approximation of the potential at a local minimum; or adding the approximation of the potential at the local minimum to the perturbation of the approximation at the local minimum.

18. The method of claim 17, wherein basis functions of the approximation to the potential at the local minimum are used to create the approximation of the ground state of a system.

19. The method of claim 18, wherein the basis functions used to create the approximation of the potential at the local minimum are limited to basis functions having a predetermined energy level.

20. The method of claim 17, wherein the approximation used is a harmonic oscillator.

21. A computer-implemented method for global optimization of a mathematical function describing a specific problem comprising:

receiving a multi-dimensional function describing a specific problem;

modeling the multi-dimensional function as a potential of a quantum mechanical particle;

employing the model to determine an optimal solution of the multi-dimensional function, the optimal solution corresponds to an approximation of a ground state solution of the potential of the quantum mechanical particle; and, providing an output associated with the determined optimal solution to an output device.

22. The method of claim 21, further comprising utilizing a gradient method to determine a location of a global minimum of the potential.

23. The method of claim 21, further comprising at least one of the following acts:

determining a ground state of the particle; or, calculating a probability density function of the ground state of the particle.

24. The method of claim 23, determining a ground state of the particle by at least one of the following acts:

creating an approximation of the potential;

employing the approximation of the potential to calculate a probability density function of the ground state of the particle based, at least in part, upon the time-independent Schrödinger Equation.

25. The method of claim 24, wherein creating an approximation of the potential is based, at least in part, upon a harmonic oscillator.

26. The method of claim 24, creating an approximation of the potential further comprising at least one of the following acts:

creating a Hessian matrix of a local minimum of the potential;

factorizing harmonic oscillator wave functions by changing the coordinates of the potential to an eigenbasis of the Hessian matrix at the local minimum of the potential;

computing matrix elements of the local harmonic oscillator wave functions under a fall Hamiltonian of the system;

evaluating the matrix elements of the local harmonic oscillator wave functions in terms of one dimensional ladder operators;

performing eigen-decomposition of the matrix in order to create approximate eigenstate wave functions for a fall system of the multi-dimensional function; or summing the harmonic oscillator basis functions with coefficients being the eigenvectors of the matrix.

27. The method of claim 26, wherein the basis functions used to approximate the local minimum of the function are limited to those having a pre-determined energy level.

28. A computer readable medium storing computer executable components of a global optimization system comprising:

an input component that receives a problem, the problem being based, at least in part, upon a mathematical function describing a specific problem;

an optimization component that employs a quantum mechanical tunneling technique in connection with determining an optimal solution of the problem from among a plurality of solutions, the determination being based, at least in part, upon utilities associated with the respective solutions, the optimal solution corresponds to an approximation of a ground state solution of a quantum system, localized to the global minimum of a modeled energy potential of a particle in the quantum system; and, an output component that provides the optimal solution determined by the optimization component to an output device.

29. A computer-implemented global optimization system comprising:

means for inputting a problem, the problem being based, at least in part, upon a mathematical function describing a specific problem;

means for providing an optimal solution of the problem from among a plurality of solutions based, at least in part, upon a quantum mechanical tunneling technique, the determination being based, at least in part, upon utilities associated with the respective solutions, the optimal solution corresponds to an approximation of a ground state solution of a quantum system, localized to the global minimum of a modeled energy potential of a particle in the quantum system; and, means for outputting the optimal solution.

* * * * *

UNITED STATES PATENT AND TRADEMARK OFFICE
CERTIFICATE OF CORRECTION

PATENT NO.        : 7,398,162 B2                     Page 1 of 1
APPLICATION NO.   : 10/372160
DATED             : July 8, 2008
INVENTOR(S)       : Oliver B. Downs et al.

It is certified that error appears in the above-identified patent and that said Letters Patent is hereby corrected as shown below:

In column 14, line 35, in Claim 2, delete " his Planek's" and insert -- h is Planck's --, therefor.

In column 16, line 43, in Claim 26, delete "fall" and insert -- full --, therefor.

In column 16, line 48, in Claim 26, delete "fall" and insert -- full --, therefor.

Signed and Sealed this
Nineteenth Day of April, 2011

David J. Kappos
*Director of the United States Patent and Trademark Office*